United States Patent [19]

Kindel

[11] 4,256,246
[45] Mar. 17, 1981

[54] DEVICE FOR BREAKING A GLASS PLATE SO AS TO OBTAIN A SHARP EDGE

[75] Inventor: Erik L. Kindel, Älvsjö, Sweden

[73] Assignee: LKB-Produkter AB, Bromma, Sweden

[21] Appl. No.: 52,101

[22] Filed: Jun. 26, 1979

[30] Foreign Application Priority Data

Jul. 4, 1978 [SE] Sweden ............................... 7807502

[51] Int. Cl.³ ............................................. C03B 33/02
[52] U.S. Cl. .................................... 225/103; 225/96.5
[58] Field of Search ................... 225/2, 96.5, 103, 104

[56] References Cited

U.S. PATENT DOCUMENTS

| 3,207,398 | 9/1965 | Forsstrom et al. | 225/105 |
| 3,371,833 | 3/1968 | Sutton | 225/2 |
| 3,494,521 | 2/1970 | Hellstrom | 225/96.5 |
| 3,562,803 | 2/1971 | Townsend | 225/104 |
| 3,819,096 | 6/1974 | Pyper | 225/96.5 |
| 3,908,878 | 9/1975 | Blum | 225/96.5 |
| 4,175,684 | 11/1979 | Butler | 225/2 |

*Primary Examiner*—Frank T. Yost
*Attorney, Agent, or Firm*—Fisher, Christen & Sabol

[57] ABSTRACT

Apparatus for making glass knives for cutting specimens for viewing by optical microscopes from thin glass plates comprises the use of a breaking rule bearing against one side of a plate, at least two breaking knobs bearing against the other side of the plate on opposite sides of the breaking rule, and a scribing device arranged between the knobs to prepare a scribing line in the plate parallel with the breaking rule, the breaking rule being displaceable with respect to the scribing line to control the edge angle of the resulting knife.

6 Claims, 4 Drawing Figures

DEVICE FOR BREAKING A GLASS PLATE SO AS TO OBTAIN A SHARP EDGE

The present invention refers to a device for breaking a glass plate so as to obtain a sharp edge. The edge formed is intended to be used at a knife edge when preparing sections for light microscopy.

When cutting biological material embedded in paraffin or similar substances for preparing a sample suitable for studies in a light microscopy knives made of steel have hitherto mainly been used. The steel knives do however suffer from the essential disadvantage that they only in special cases permit sections of a thickness down to the range of 1 mu. This is an essential disadvantage which recently has been more significant when thermosetting resins often replace the paraffin when embedding the material for light microscopy studies. These resins give a better resolution of the tissue and could be cut in thinner sections than parrafin and are therefore preferred as an embedding material in investigations requiring an optimal resolution. The thickness range in these cases is between 0.5 and 3 mu for which the steel knives in practice are not useable. Attempts have therefore been made to replace the steel knives by glass knives of the type hitherto used in ultramicrotomes, i.e. instruments to be used for cutting a sample to be studied in an electron microscope. These glass knives ae produced by breaking a glass plate, an edge of the breaking surface being used as a knife edge. Manual production of such glass knives for light microscopy gives however very bad results and one has to produce a high number of knives of which only a minor part meet the requirements. When producing glass knives for light microscopy one has therefore started to use the type of devices for manufacturing ultramicrotomy knives which is described for instance in the Swedish Pat. No. 310768. These devices do however suffer from the disadvantage that the length of the knife edge is determined by the thickness of the broken glass plate. When producing sections for light microscopy one does however need knives of a length of up to 40 mm and the breaking of glass plates of this thickness is not possible with the type of devices described in the above cited patent, since the breaking forces thereby required would be unreasonably high. The devices described in the above cited patent could produce knives of a length up to 12.5 mm but even at this length the breaking forces are so high that the production involves considerable risks for the operator.

It is an object of the present invention to provide a device by means of which long glass knives can be produced in a simple, safe and reproducible way. The characteristics of the invention will appear from the claims attached to the specification.

The invention will now be described in detail, reference being made to the attached drawing in which.

Figure 1:
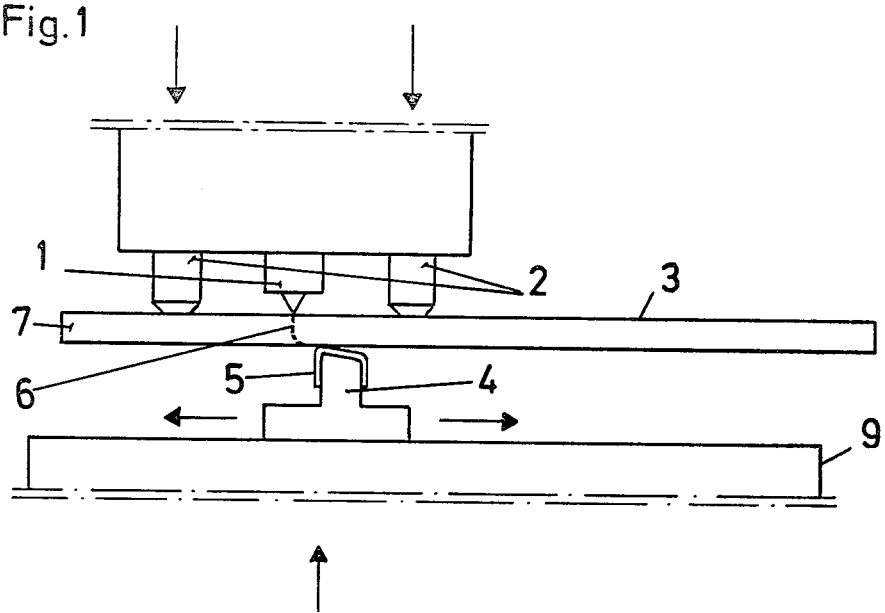
FIG. 1 is a schematical side view of a device according to the invention.
Figure 3A:
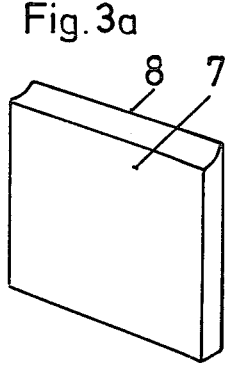
Figure 3B:
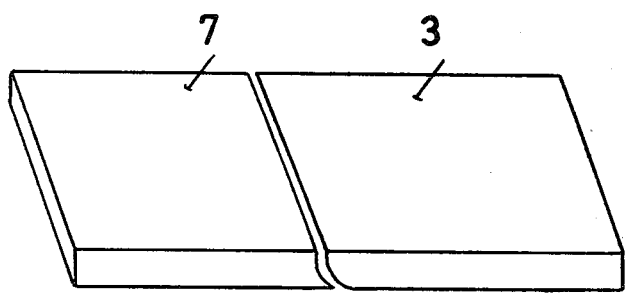

FIGS. 3a and b show glass plates broken in the device according to FIG. 1.

Figure 2:
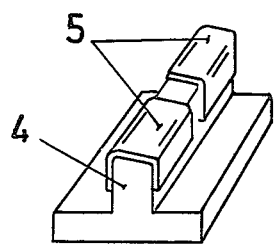
FIG. 2 shows the breaking rule used in the device according to FIG. 1.

In FIG. 1 reference 9 denotes a bottom plate on which a breaking rule 4 is displaceably arranged. The breaking rule 4 is provided with two breaking shoes 5 (FIG. 2) which are made from a relatively soft material for instance aluminum and are symmetrically arranged with a certain internal distance. A glass plate 3, 7 is clamped between the breaking rule and two breaking knobs 2. Between the breaking knobs a scribing device 1 is arranged, this device being displaceable parallel to the breaking rule so as to provide a scribed line along the rule.

When producing a glass knife 7 with an edge 8 (FIG. 3a) a scribing line is made by the scribing device 1, whereafter the breaking knobs are pressed downwards and the glass plate is broken towards the breaking rule along a breaking surface 6. It thereby appears that by displacing the breaking rule perpendicularly to its longitudinal extension a breaking surface is obtained which starts from the scribing line and bends towards the edge of the breaking rule. By displacing the breaking rule the desired edge angle could thus be obtained.

The advantage of the device hitherto described is that the breaking forces required are limited, since a glass plate of a thickness of 6 mm is preferably used. The knife obtained could however in spite of this be made three times as long as by the use of a 12.5 mm thick glass plate at an instrument in accordance with the above cited patent. Furthermore, the edge angle could easily be changed in a reproducible way.

Concerning the design of the breaking rule it appears that it is essential to obtain an even pressure along the glass plate and the rule has therefore been provided with two displaceable shoes which are suitably made by a soft material, for instance aluminum, for avoiding high pressures at certain points. It has furthermore proved to be advantageous to have a certain distance between the shoes since one single integral rule easily gives rise to a bending of the breaking surface along the rule.

We claim:

1. A breaking rule to be arranged on one side of a glass plate for breaking the plate to make a glass knife as a result of force applied by a least two spaced breaking knobs moving in a perpendicular direction against the opposite side of the glass plate, the knobs being disposed on opposite sides of a straight line scribed in the surface of the opposite side of the plate, characterized in that the breaking rule comprises:
   a flat base to be displaceably supported on a flat surface parallel with respect to the glass plate;
   said base including a medially located portion projecting outwardly toward said one side of the glass plate and having a narrow surface elongated in a direction parallel with said scribed line and facing said one side of the plate for contact therewith;
   said base being movable along said flat surface in a path at right angles to said scribed line to vary the edge angles to the resulting knife in accordance with the displacement of the location of contact between said narrow surface and said scribed line.

2. A breaking rule as defined in claim 1, wherein the narrow elongated surface includes shoe means facing said one side of the glass plate comprises a layer of relatively soft material for contact with said plate.

3. A breaking rule as defined in claim 2, wherein the surface of said shoe means facing said one side of the plate lies generally in a plane angularly disposed with respect to the plane of the glass plate.

4. A breaking rule as defined in claim 1, wherein said projecting portion of the base is centrally recessed to provide two aligned narrow elongated surfaces spaced from each other.

5. A breaking rule as defined in either claim 2 or 3, wherein said shoe means comprises a layer of aluminum.

6. A breaking rule as defined in claim 5, wherein a centrally disposed portion of said layer of aluminum is omitted to provides two longitudinally aligned layers of aluminum spaced from each other.

* * * * *